United States Patent
Lee et al.

(10) Patent No.: US 8,301,674 B2
(45) Date of Patent: Oct. 30, 2012

(54) RANDOM SIGNAL GENERATOR AND RANDOM NUMBER GENERATOR INCLUDING THE SAME

(75) Inventors: Choong-Hoon Lee, Seoul (KR); Soon-Kyun Shin, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1274 days.

(21) Appl. No.: 12/041,122

(22) Filed: Mar. 3, 2008

(65) Prior Publication Data

US 2008/0313250 A1 Dec. 18, 2008

(30) Foreign Application Priority Data

Mar. 23, 2007 (KR) .................. 10-2007-0028353

(51) Int. Cl.
*G06F 1/02* (2006.01)
*G06F 7/58* (2006.01)

(52) U.S. Cl. ..................... 708/255; 708/250
(58) Field of Classification Search ........... 708/250–256
See application file for complete search history.

(56) References Cited

U.S. PATENT DOCUMENTS

| | | | | |
|---|---|---|---|---|
| 5,239,494 A * | 8/1993 | Golbeck | ........................... | 708/3 |
| 5,926,066 A * | 7/1999 | Sauer | ................................ | 330/9 |
| 5,961,577 A * | 10/1999 | Soenen et al. | ................. | 708/251 |
| 6,188,294 B1 * | 2/2001 | Ryan et al. | ....................... | 331/78 |
| 6,195,669 B1 * | 2/2001 | Onodera et al. | .................. | 708/3 |
| 6,741,129 B1 * | 5/2004 | Corsi et al. | ..................... | 330/252 |
| 7,007,060 B2 * | 2/2006 | Miller, Jr. | ....................... | 708/801 |
| 7,099,906 B2 * | 8/2006 | Messina et al. | ................ | 708/255 |
| 7,129,797 B2 * | 10/2006 | Burdo | .............................. | 331/78 |
| 7,243,117 B2 * | 7/2007 | Yamamoto et al. | ........... | 708/250 |
| 7,401,108 B2 * | 7/2008 | Miller, Jr. | ...................... | 708/250 |
| 7,602,227 B2 * | 10/2009 | Kim et al. | ...................... | 327/359 |
| 7,702,701 B2 * | 4/2010 | Kim | .................................. | 708/3 |
| 7,750,737 B2 * | 7/2010 | Srinivasa et al. | .............. | 330/259 |
| 2008/0126458 A1 * | 5/2008 | Shin | .............................. | 708/255 |

FOREIGN PATENT DOCUMENTS

| | | |
|---|---|---|
| KR | 1020010085673 A | 9/2001 |
| KR | 1020020020989 A | 3/2002 |
| KR | 100421564 B1 | 2/2004 |
| KR | 1020040093872 A | 11/2004 |

OTHER PUBLICATIONS

"An Integrated Analog/Digital Random Noise Source", Holman et al., IEEE Transactions on Circuits and Systems: Fundamental Theory and Applications, vol. 44, No. 6, Jun. 1997.

* cited by examiner

*Primary Examiner* — Chat Do
*Assistant Examiner* — Matthew Sandifer
(74) *Attorney, Agent, or Firm* — Volentine & Whitt, PLLC

(57) ABSTRACT

A random signal generator includes a differential noise generation circuit, an amplification circuit and a single-ended amplifier. The differential noise generation circuit includes a pair of input nodes and a pair of output nodes, and is configured to receive noise signals at the pair of input nodes and to generate differential noise signals at the pair of output nodes. The differential noise generation circuit is self-biased such that the pair of input nodes is coupled to the pair of output nodes. The amplification circuit is configured to amplify the differential noise signals output from the differential noise generation circuit to generate amplified differential signals. The single-ended amplifier is configured to generate a random signal based on the amplified differential signals, the random signal having irregular transition time points.

10 Claims, 7 Drawing Sheets

RANDOM SIGNAL GENERATOR AND RANDOM NUMBER GENERATOR INCLUDING THE SAME

CROSS-REFERENCE TO RELATED APPLICATIONS

A claim of priority is made to Korean Patent Application No. 10-2007-0028353, filed on Mar. 23, 2007, the subject matter of which is hereby incorporated by reference.

BACKGROUND OF THE INVENTION

1. Field of the Invention

The present invention relates to generating random signals, and more particularly, to a random signal generator, a random number generator including the random signal generator, and a method of generating a random signal.

2. Description of the Related Art

Generally, secure data communications, involving a smart card, for example, may require an encrypted key for protecting user information. Random numbers are typically used to generate the encrypted key. A random number may be classified as a pseudo random number or a physical random number.

A pseudo random number is generated artificially by logic circuits and software programs. For example, the pseudo random number may be generated using a Rivest-Shamir-Adelman (RSA) cryptoalgorithm and an elliptic curve cryptosystem. However, the pseudo random number has a deterministic sequence, which may be anticipated by a hacker if an initial condition of the pseudo random number system is revealed.

A physical random number, also referred to as a true random number, may be generated based on a physical phenomenon that exists in the natural world. Thermal noise of a resistor, short noise of a PN junction of a semiconductor and radioactive waves are examples of such a physical phenomenon. Because the physical phenomenon cannot be predicted, the physical random number is more appropriate for protecting private information. However, noise intensity of the underlying physical phenomenon on which the random number is based is typically small, and thus a high voltage is required to convert the small noise to a random number. Consequently, many difficulties arise in attempting to apply a physical random number to a large-scale integrated circuit (LSI), for example.

An example of a random number generator circuit using thermal noise is described in HOLMAN et al., "An Integrated Analog/Digital Random Noise Source," IEEE TRANSACTIONS ON CIRCUITS AND SYSTEMS: FUNDAMENTAL THEORY AND APPLICATIONS, Vol. 44, No. 6 (June 1997). In the random number generator circuit, a resistor for generating thermal noise is coupled to both sides of an amplifier. In addition, the random number generator circuit includes a structure for comparing an output of the amplifier and a reference voltage. As the random number generator circuit uses the resistor as a feedback device, an output impedance of the amplifier must be considerably small. Therefore, the disclosed random number generator circuit is not appropriate for complementary metal oxide semiconductor (CMOS) processes, for example, because of increased size and power consumption of the circuit.

When the amplifier of a conventional random number generator circuit has a voltage offset, the operation of the amplifier runs off a saturation region. Therefore, sufficient voltage gain may not be acquired. In addition, when a source voltage and/or a ground voltage fed to the random number generator circuit includes noise, the randomness of the generated sequences may be degraded. When a low drop output (LDO) regulator is included to stabilize a power supply voltage, the structure of the random number generator circuit becomes more complex. Further, the LDO may not adequately address problems associated with noise in the ground voltage.

SUMMARY OF THE INVENTION

Exemplary embodiments of the present invention provide a random signal generator which may have a differential self-biased structure, and a random number generator including the random signal generator. The random number generator may include an open-loop scheme for reducing a restriction of impedances and operating capability in low voltage regions. Also, embodiments of the present invention may provide a method of generating a random number that is insensitive to noise and is highly random. The method may be performed with a relatively low voltage and may reduce impedance restrictions.

In a representative embodiment of the present invention, a random signal generator includes a differential noise generation circuit, an amplification circuit and a single-ended amplifier. The differential noise generation circuit includes a pair of input nodes and a pair of output nodes, and is configured to receive noise signals at the pair of input nodes and to generate differential noise signals at the pair of output nodes. The differential noise generation circuit is self-biased such that the pair of input nodes is coupled to the pair of output nodes. The amplification circuit is configured to amplify the differential noise signals output from the differential noise generation circuit to generate amplified differential signals. The single-ended amplifier is configured to generate a random signal based on the amplified differential signals, the random signal having irregular transition time points.

The differential noise generation circuit may include a self-bias resistor pair coupled between the pair of input nodes and the pair of output nodes. The differential noise generation circuit may further include a noise resistor pair and a capacitor pair serially coupled between the pair of input nodes and a power supply voltage.

In various embodiments, the differential noise generation circuit may include a metal oxide semiconductor (MOS) differential pair, a self-bias resistor pair, a noise resistor pair and a capacitor pair. The MOS differential pair may be coupled between a first voltage and a second voltage, where gate electrodes of the MOS differential pair are coupled to the pair of input nodes and drain electrodes of the MOS differential pair are coupled to the pair of output nodes. The self-bias resistor pair may be coupled between the pair of input nodes and the pair of output nodes, and the noise resistor pair may be coupled to the pair of input nodes. The capacitor pair may be coupled between the noise resistor pair and the second voltage. The differential noise generation circuit may further include an input resistor pair coupled between the pair of input nodes and the gate electrodes of the MOS differential pair.

For example, the MOS differential pair may include a resistor pair, an n-channel metal oxide semiconductor (NMOS) transistor pair and a current source. The resistor pair may be coupled between the first voltage and the pair of output nodes, the first voltage corresponding to a power supply voltage. The NMOS transistor pair may be coupled between the pair of output nodes and a common source node.

The current source may be coupled between the second voltage and the common source node, the second voltage corresponding to a ground voltage.

Alternatively the MOS differential pair may include a resistor pair, a p-channel metal oxide semiconductor (PMOS) transistor pair and a current source. The resistor pair may be coupled between the first voltage and the pair of output nodes, the first voltage corresponding to a ground voltage. The PMOS transistor pair may be coupled between the pair of output nodes and a common source node. The current source may be coupled between the second voltage and the common source node, the second voltage corresponding to a power supply voltage.

The amplification circuit may include cascaded differential amplifiers. Each of the differential amplifiers may include a MOS differential pair and a self-bias resistor pair. The MOS differential pair may be coupled between a first voltage and a second voltage. A pair of input nodes of the MOS differential pair may receive differential signals output from a previous stage corresponding to one of the differential noise generation circuit or a previous differential amplifier. A pair of output nodes of the MOS differential pair may output amplified differential signals to a next stage corresponding to one of a next differential amplifier or the single-ended amplifier. The self-bias resistor pair may be coupled between the pair of input nodes of the MOS differential pair and the pair of output nodes of the MOS differential pair.

The MOS differential pair may include a resistor pair, an NMOS transistor pair, and a current source. The resistor pair may be coupled between the first voltage and the pair of output nodes, the first voltage corresponding to a power supply voltage. The NMOS transistor pair may be coupled between the pair of output nodes and a common source node. The current source may be coupled between the second voltage and the common source node, the second voltage corresponding to a ground voltage.

Each of the differential amplifiers may further include a capacitor pair coupled to the pair of input nodes. The capacitor pair may be configured to remove a DC component of the differential signal received from the previous stage and to provide an AC component of the differential signal to the pair of input nodes of the MOS differential pair.

In another representative embodiment of the present invention, a random number generator includes a differential noise generation circuit, an amplification circuit, a single-ended amplifier, a sampler and a processor. The differential noise generation circuit includes a pair of input nodes and a pair of output nodes, and is configured to receive noise signals at the pair of input nodes and to generate differential noise signals at the pair of output nodes. The differential noise generation circuit is self-biased such that the pair of input nodes is coupled to the pair of output nodes. The amplification circuit is configured to amplify the differential noise signals to generate amplified differential signals. The single-ended amplifier is configured to generate a random signal based on the amplified differential signals, the random signal having irregular transition time points. The sampler is configured to sample the random signal to generate a random bit stream. The processor is configured to process the random bit stream to generate random numbers.

The differential noise generation circuit may include a self-bias resistor pair coupled between the pair of input nodes and the pair of output nodes. The differential noise generation circuit may further include a noise resistor pair and a capacitor pair serially coupled between the pair of input nodes and a power supply voltage.

The differential noise generation circuit may include a MOS differential pair, a self-bias resistor pair, a noise resistor and a capacitor pair. The MOS differential pair may be coupled between a first voltage and a second voltage, gate electrodes of the MOS differential pair being coupled to the pair of input nodes and drain electrodes of the MOS differential pair being coupled to the pair of output nodes. The self-bias resistor pair may be coupled between the pair of input nodes and the pair of output nodes. The noise resistor pair may be coupled to the pair of input nodes. The capacitor pair may be coupled between the noise resistor pair and the second voltage. The MOS differential pair may be one of an NMOS differential pair or a PMOS differential pair.

The amplification circuit may include cascaded differential amplifiers. Each of the differential amplifiers may include a MOS differential pair and a self-bias resistor pair. The MOS differential pair may be coupled between a first voltage and a second voltage. A pair of input nodes of the MOS differential pair may receive differential signals from a previous stage corresponding to one of the differential noise generation circuit or a previous differential amplifier, and a pair of output nodes of the MOS differential pair may output amplified differential signals to a next stage corresponding to one of a next differential amplifier or the single-ended amplifier. The self-bias resistor pair may be coupled between the pair of input nodes of the MOS differential pair and the pair of output nodes of the MOS differential pair.

Each of the differential amplifiers may further include a capacitor pair coupled to the pair of input nodes. The capacitor pair may be configured to remove a DC component of the differential signal received from the previous stage, and to provide an AC component of the differential signal to the pair of input nodes of the MOS differential pair.

The sampler may include a flip-flop. The flip-flop may be configured to generate the random bit stream based on the random signal and a clock signal, the random bit stream being synchronized with transitions of the clock signal.

In a method of generating a random number, according to representative embodiments of the present invention, a differential noise signal is generated at a pair of output nodes of a MOS differential pair based on noise signals received at a pair of input nodes of the MOS differential pair. The pair of input nodes and the pair of output nodes are coupled to each other, so that the input nodes are self-biased. Amplified differential signals are generated by amplifying the differential noise signals. A random signal, having irregular transition time points, is generated based on the amplified differential signal. The random number is generated by processing the random signal.

To generate the differential noise signal, a self-bias resistor pair may be coupled between the pair of input nodes and the pair of output nodes. In this case, a noise resistor pair and a capacitor pair may be serially coupled to the pair of input nodes, and a direct voltage is applied to the capacitor pair.

In amplifying the differential noise signal, the differential noise signal may be amplified step-by-step, using multiple cascaded differential amplifiers. Further, in amplifying the differential noise signal step-by-step, each of the differential amplifiers may include a self-bias resistor coupled between the pair of input nodes and the pair of output nodes, and a DC component of the differential signal may be removed to provide an AC component of the differential signal to the pair of input nodes of the MOS differential pair. The DC component of the differential signal may be received from a previous stage, which may correspond to the differential noise generation circuit or the previous differential amplifier.

In processing the random signal, the random signal may be sampled to generate a random bit stream. The random bit stream may be processed to generate the random number.

Consequently, according to exemplary embodiments of the present invention, a random signal generator, and a random number generator including the random signal generator, may generate random signals and random numbers, which are insensitive to noise and have relatively high randomness.

DESCRIPTION OF THE EMBODIMENTS

Figure 1:
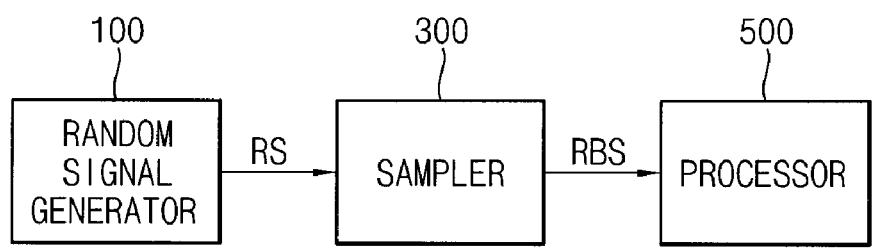
FIG. 1 is a block diagram illustrating a random number generator, according to an exemplary embodiment of the present invention.

Embodiments of the present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

It will be understood that, although the terms first, second, etc., may be used herein to describe various elements, these elements should not be limited by these terms. These terms are used to distinguish one element from another. For example, a first element could be termed a second element, and similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the embodiments. As used herein, the singular forms "a," "an" and "the" are intended to include the plural forms as well, unless the context indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having meanings consistent with their meanings in the context of the relevant art and will not be interpreted in an idealized or overly formal sense, unless expressly so defined herein.

FIG. 1 is a block diagram illustrating a random number generator, according to an illustrative embodiment of the present invention.

Referring to FIG. 1, a random number generator 10 includes a random signal generator 100, a sampler 300 and a processor 500.

The random signal generator 100 generates differential noise signals using a self-biased differential amplifier. The random signal generator 100 amplifies the differential noise signals and converts the amplified differential noise signals to a random signal RS using a single-ended amplifier. The random signal RS is a single mode output, and has an irregular duration time in logic high level and logic low level.

The sampler 300 samples the random signal RS generated by the random signal generator 100 to produce a random bit stream RBS. The processor 500 generates a random number by processing the random bit stream RBS.

Figure 2:
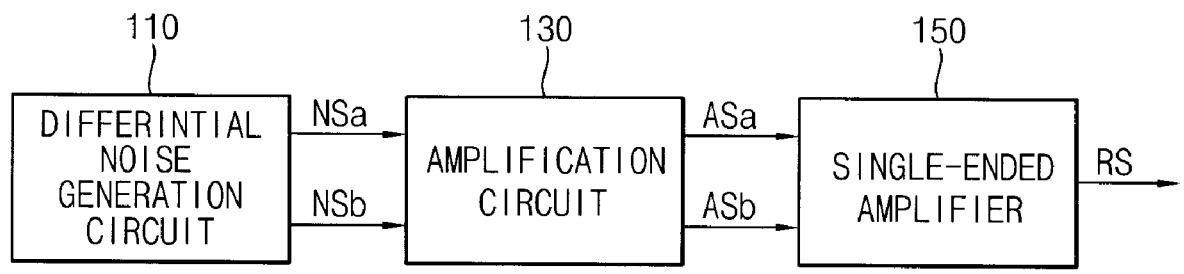
FIG. 2 is a block diagram illustrating a random signal generator, according to an exemplary embodiment of the present invention.

FIG. 2 is a block diagram illustrating a random signal generator, according to an illustrative embodiment of the present invention.

Referring to FIG. 2, the random signal generator 100 includes a differential noise generation circuit 110, an amplification circuit 130 and a single-ended amplifier 150.

The differential noise generation circuit 110 may be self-biased, such that a pair of input nodes is coupled to a pair of output nodes. Noise signals are fed to each of the input nodes, and differential noise signals NSa and NSb are generated at the output nodes.

For example, the differential noise generation circuit 110 may be self-biased by coupling a resistor pair between the pair of input nodes and the pair of output nodes. The differential noise generation circuit 110 may further include a noise resistor pair and a capacitor pair coupled in series between the pair of input nodes and a direct voltage source. For example, in the differential noise generation circuit, a power supply voltage or a ground voltage may be a direct voltage source fed to the noise resistor pair. The noise resistor pair, acting as a noise source, generates a thermal noise signal at the input nodes. The capacitors separate the noise resistor pair from the input nodes, and receive the direct voltage to prevent a direct current from sinking to the ground.

The amplification circuit 130 amplifies the differential noise signals NSa and NSb and outputs amplified differential signals ASa and ASb. The single-ended amplifier 150 amplifies the amplified differential signals ASa and ASb and outputs the random signal RS, which has random transition time points, based on the amplified differential signals ASa and ASb.

Figure 3:
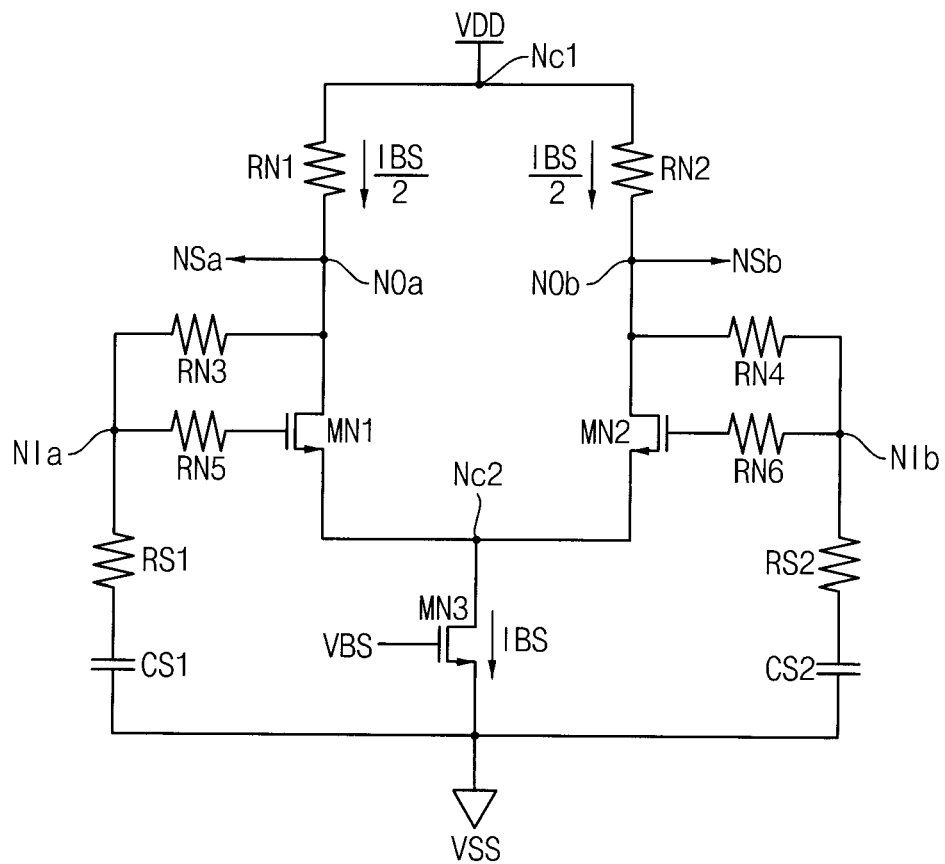
FIG. 3 is a circuit diagram illustrating an example of a differential noise generation circuit included in the random signal generator of FIG. 2, according to an exemplary embodiment of the present invention.

FIG. 3 is a circuit diagram illustrating an example of the differential noise generation circuit included in the random signal generator of FIG. 2, according to an illustrative embodiment of the present invention.

Referring to FIG. 3, the differential noise generation circuit 110 includes metal-oxide semiconductor (MOS) differential pair indicated by RN1, RN2, MN1, MN2 and MN3, a self-bias resistor pair RN3 and RN4, a noise resistor pair RS1 and RS2, and a capacitor pair CS1 and CS2.

As illustrated in FIG. 3, the MOS differential pair may have a symmetric structure including at least one pair of MOS transistors MN1 and MN2 and one pair of resistors RN1 and RN2, commonly biased by a current source MN3. The MOS differential pair is coupled between a first voltage and a second voltage. For example, the first voltage may be a power supply voltage VDD and the second voltage may be a ground voltage VSS. A pair of input nodes NIa and NIb of the MOS differential pair is coupled to gate electrodes of the MOS transistors MN1 and MN2, respectively. A pair of output nodes NOa and NOb of the MOS differential pair is coupled to drain electrodes of the MOS transistors MN1 and MN2, respectively.

The pair of input nodes NIa and NIb of the MOS differential pair is coupled to the pair of output nodes NOa and NOb of the MOS differential pair through the self-bias resistor pair RN3 and RN4. The noise resistor pair RS1 and RS2 is connected to the pair of input nodes NIa and NIb, and the capacitor pair CS1 and CS2 is coupled between the noise resistor pair RS1 and RS2 and the second voltage.

The noise resistor pair RS1 and RS2 functions as a thermal noise source and provides the noise signals to the pair of input nodes NIa and NIb. The thermal noise is a kind of a white noise. According to a value of the resistance, the thermal noise has an arbitrary value in a whole frequency band and is substantially random in a time domain. Although the noise resistor pair RS1 and RS2 is depicted as a thermal noise source in FIG. 3, it is understood that the noise source is not limited to a thermal noise source in various other embodiments. That is, noise signals may be fed to the pair of input nodes NIa and NIb using unpredictable physical phenomena other than thermal noise. The capacitor pair CS1 and CS2, through the noise resistor pair RS1 and RS2, prevents a direct current from flowing to ground and removes an offset of the ground voltage.

The differential noise generation circuit 110 may include the resistor pair RN5 and RN6 to control input impedance and gain. The resistor pair RN5 and RN6 is coupled between the pair of input nodes NIa and NIb and the gate electrodes of the transistors MN1 and MN2.

The example of the differential noise generation circuit 110 depicted in FIG. 3 is implemented using an n-channel metal oxide semiconductor (NMOS) differential pair. The NMOS differential pair includes paths formed by the resistor pair RN1 and RN2 and NMOS pair MN1 and MN2. The resistor pair RN1 and RN2 is coupled between the power supply voltage VDD and the pair of output nodes NOa and NOb. The NMOS pair MN1 and NM2 is coupled between the pair of output nodes NOa and NOb and a common source node Nc2. A current source MN3 is coupled between the ground voltage VSS and the common source node Nc2, and generates a bias current IBS.

The self-bias resistor pair RN3 and RN4 is connected between the pair of input nodes NIa and NIb and the pair of output nodes NOa and NOb. An output voltage VOUT of the output node NOa in the symmetrical MOS differential pair may be derived, for example, from Equation 1 and Equation 2, below.

$$\frac{IBS}{2} = \frac{1}{2}\mu_n Cox \frac{W}{L}(VOUT - Vx - Vth)^2 \quad \text{[Equation 1]}$$

$$VOUT = \left(\frac{IBS * L}{\mu_n Cox * W}\right)^{0.5} + Vx + Vth = VDD - \frac{IBS}{2} * RN1 \quad \text{[Equation 2]}$$

In Equations 1 and 2, $\mu_n$ denotes electron mobility, $C_{ox}$ denotes capacitance per unit area of a gate oxide in the MOS transistor MN1, W/L denotes a shape ratio (or a size), $V_{th}$ denotes a threshold voltage and $V_x$ denotes a source voltage of the MOS transistor MN1, that is, the voltage of node Nc2.

Figure 8:
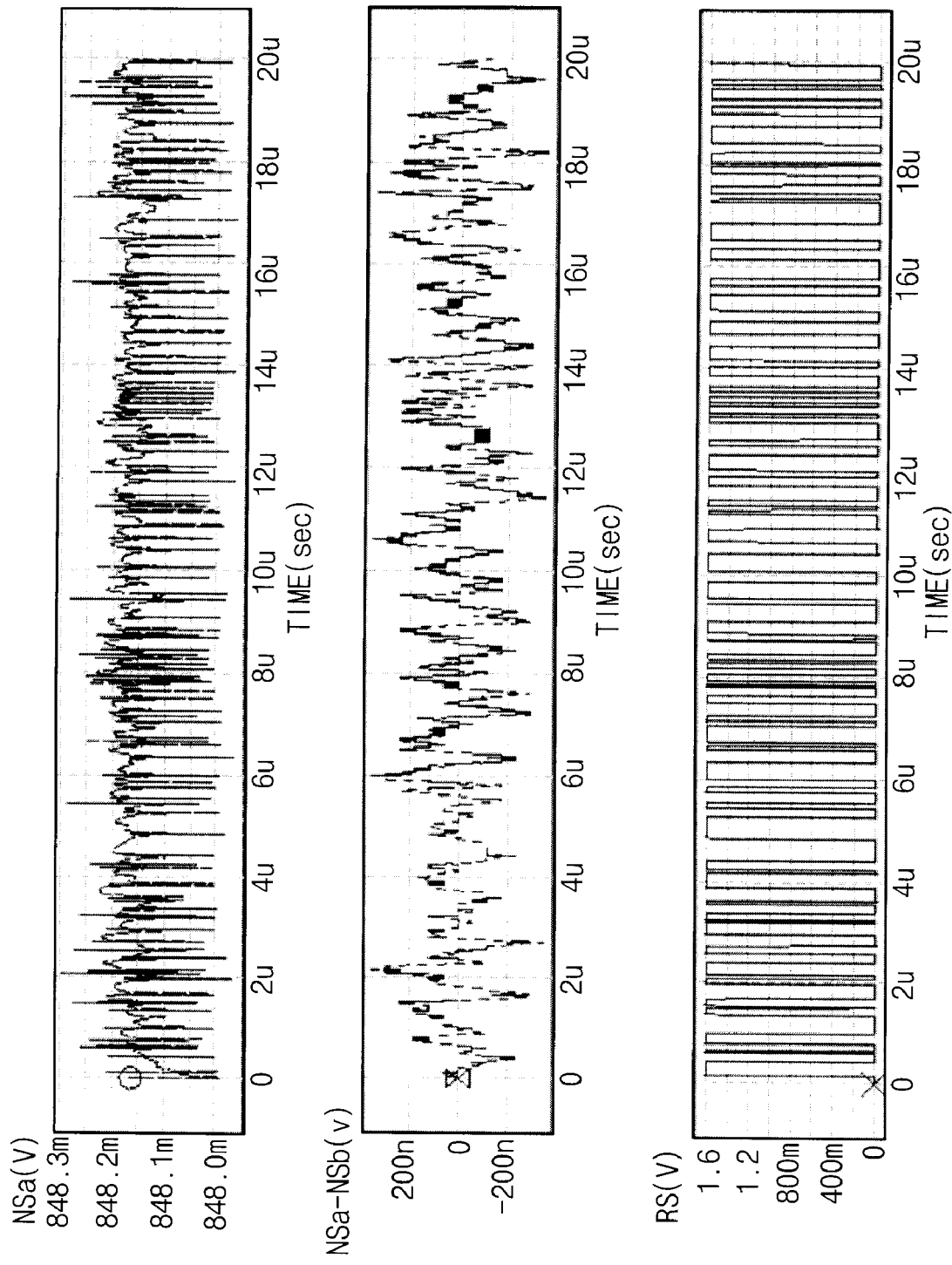
FIG. 8 is a diagram illustrating waveforms of exemplary signals in the random signal generator of FIG. 2, according to an exemplary embodiment of the present invention.

According to a large-signal analysis, each current of the resistor pair RN1 and RN2 is identical to the current IBS/2 as represented in Equation 1, and each voltage of the output node pair NOa and NOb is identical to the voltage VOUT as represented in Equation 2. However, the noise resistor pair RS1 and RS2 connected to the input node pair NIa and NIb generates the thermal noise, and thus, the differential noise signals NSa and NSb respectively output from the output node pair NOa and NOb have random levels of voltages, e.g., as illustrated in FIG. 8. In fact, the other resistors RN1 to RN6 shown in FIG. 3, in addition to the noise resistor pair RS1 and RS2, may contribute to the thermal noise. The thermal noise caused by each of the resistors is combined uncorrelatedly to generate the differential noise signals NSa and NSb.

In alternative exemplary embodiments of the present invention, the differential noise generation circuit 110 may be implemented by a p-channel metal-oxide semiconductor (PMOS) differential pair (not shown). In this case, the NMOS transistors MN1, MN2 and MN3 in FIG. 3 would be replaced with PMOS transistors, and the power supply voltage VDD would be exchanged with the ground voltage VSS. The PMOS differential pair includes two paths formed by a resistor pair (e.g., RN1, RN2) and the PMOS pair. The resistor pair is coupled between the ground voltage VSS and the pair of output nodes (e.g., NOa and NOb). The PMOS pair is coupled between the pair of output nodes and a common source node (e.g., Nc2). The current source is coupled between the power supply voltage VDD and provides the bias current.

Further, the differential pair of the differential noise generation circuit 110 may be implemented using devices other than MOS transistors, which are functionally similar to MOS transistors, such as bipolar junction transistors (BJTs), etc.

Figure 4:
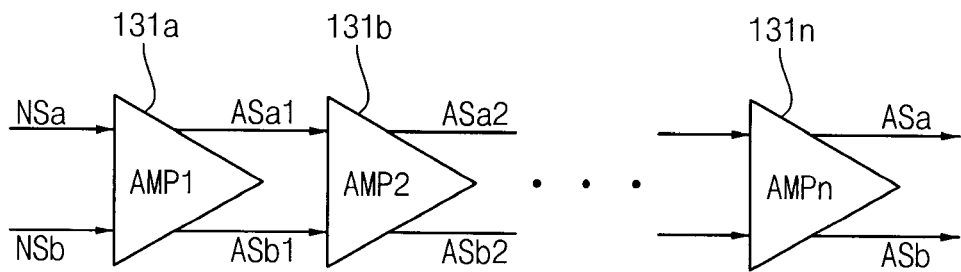
FIG. 4 is a circuit diagram illustrating an example of an amplification circuit included in the random signal generator of FIG. 2, according to an exemplary embodiment of the present invention.

FIG. 4 is a circuit diagram illustrating an example of an amplification circuit included in the random signal generator of FIG. 2, according to an illustrative embodiment of the present invention.

Referring to FIG. 4, the amplification circuit 130 includes cascaded differential amplifiers 131a, 131b . . . 131n. The cascaded differential amplifiers 131a, 131b and 131n output amplified differential signals ASa1, ASb1; ASa2, ASb2; and ASa, ASb, respectively, which are consecutively amplified. In other words, the amplification circuit 130 amplifies input differential noise signals NSa and NSb in consecutive steps and outputs the amplified differential signals ASa and ASb.

Each of the cascaded differential amplifiers 131a, 131b and 131n may remove a DC component of the differential signal output from a previous stage (i.e., the differential noise generation circuit or the preceding differential amplifier). Also, each of the cascaded differential amplifiers 131a, 131b and 131n may provide only an AC component of the differential signal to the next stage (i.e., the single-ended amplifier 150 or a next differential amplifier).

Figure 5:
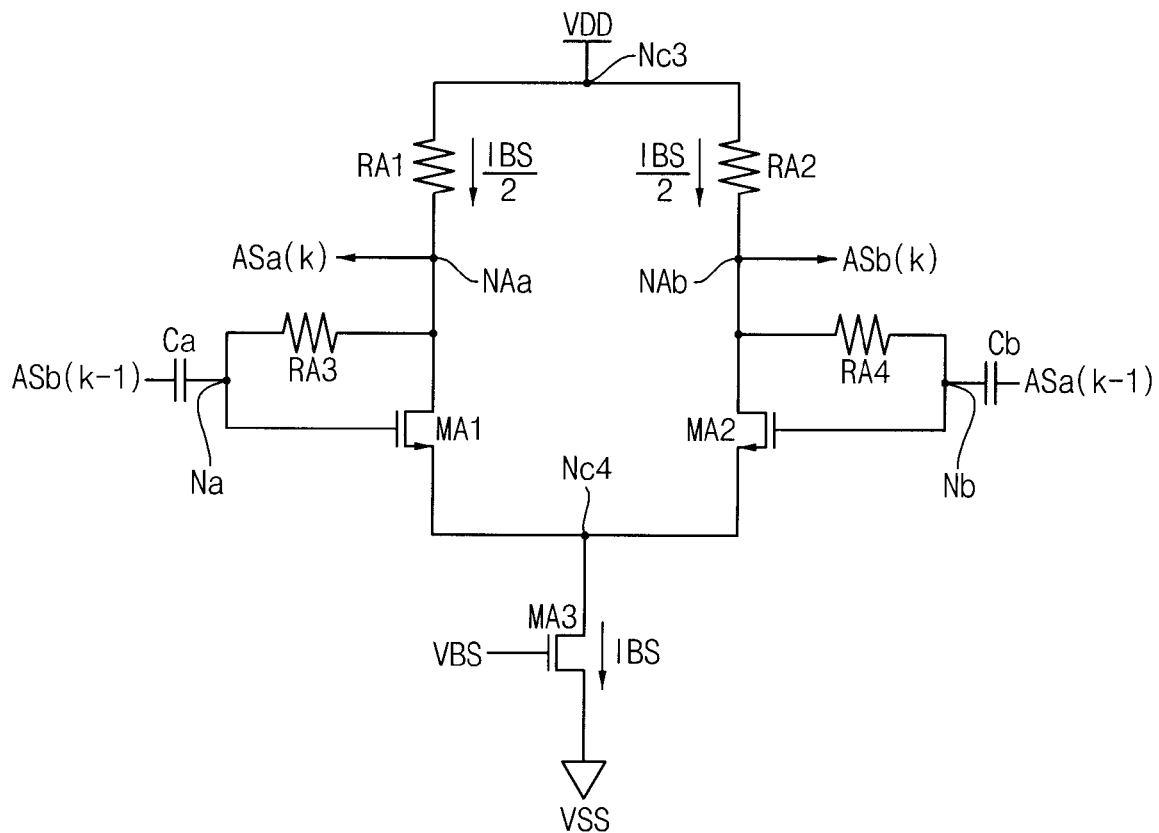
FIG. 5 is a circuit diagram illustrating an example of a differential amplifier included in the amplification circuit of FIG. 4, according to an exemplary embodiment of the present invention.

FIG. 5 is a circuit diagram illustrating an example of a differential amplifier included in the amplification circuit of FIG. 4, according to an illustrative embodiment of the present invention.

Referring to FIG. 5, a differential amplifier 131k includes a MOS differential pair, including RA1, RA2, MA1, MA2 and MA3, and a self-bias resistor pair RA3 and RA4. The MOS differential pair RA1, RA2, MA1, MA2 and MA3 is coupled between the first voltage and the second voltage. The MOS differential pair receives differential signals ASa(k−1) and ASb(k−1) from a previous stage through a pair of input nodes Na and Nb, respectively. The MOS differential pair outputs amplified differential signals ASa(k) and ASb(k) to the next stage through a pair of output nodes NAa and NAb. The self-bias resistor pair RA3 and RA4 is coupled between the input node pair Na and Nb of the MOS differential pair and the output node pair NAa and NAb of the MOS differential pair.

The differential amplifier 131k illustrated in FIG. 5 operates to remove offset from the input differential signals ASa(k−1) and ASb(k−1), in addition to amplifying the differential signals ASa(k−1) and ASb(k−1). The differential amplifier 131k may have a minute offset since it is difficult to accomplish perfectly identical characteristics of the resistors and the transistors forming a symmetric structure. The offset in the differential amplifier 131k may cause a corresponding output to lean upon the power supply voltage VDD or the ground voltage VSS, thereby degrading randomness of the output signal. To avoid such degradation, the differential amplifier 131k may further include a capacitor pair Ca and Cb coupled to the input node pair Na and Nb. The capacitor pair Ca and Cb may remove DC components of the input differential signals ASa(k−1) and ASb(k−1) from the previous stage and provide AC components of the differential signals ASa(k−1) and ASb(k−1) to the input node pair Na and Nb, respectively.

The representative structure of the FIG. 5 may be applied to each of the cascaded differential amplifiers 131a, 131b and 131n. The cascaded differential amplifiers 131a, 131b and 131n repeatedly perform the functions of amplification and offset removal, and thus generate amplified differential signals ASa and ASb, which may swing fully between the power supply voltage VDD and the ground voltage VSS.

Figure 6:
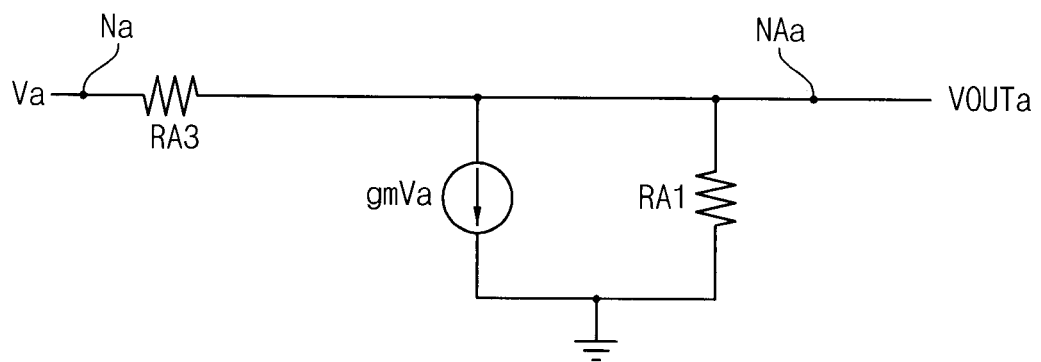
FIG. 6 is an equivalent circuit diagram of the differential amplifier of FIG. 5 for illustrating a gain of the differential amplifier, according to an exemplary embodiment of the present invention.

FIG. 6 is an equivalent circuit diagram of a differential amplifier of FIG. 5 for illustrating a gain of the differential amplifier, according to an illustrative embodiment of the present invention.

Referring to FIG. 6, nodes Nc3 and Nc4 in FIG. 5 correspond to a common ground of FIG. 6. A voltage gain of the differential amplifier 131k of FIG. 5 may be expressed by the ratio of a voltage Va of the input node Na and a voltage VOUTa of the output node NAa. The voltage gain VOUTa/Va of the differential amplifier 131k of FIG. 5 is represented by Equation 3, below.

$$\frac{VOUTa}{Va} = -\frac{gm - \frac{1}{RA3}}{\frac{1}{RA1} + \frac{1}{RA3}} \qquad \text{[Equation 3]}$$

In Equation 3, $g_m$ denotes a transconductance of the MOS transistor MA1.

The number of differential amplifiers included in the amplification circuit 130 may be varied, for example, according to the voltage gain of the respective differential amplifiers, as represented by Equation 3.

Figure 7:
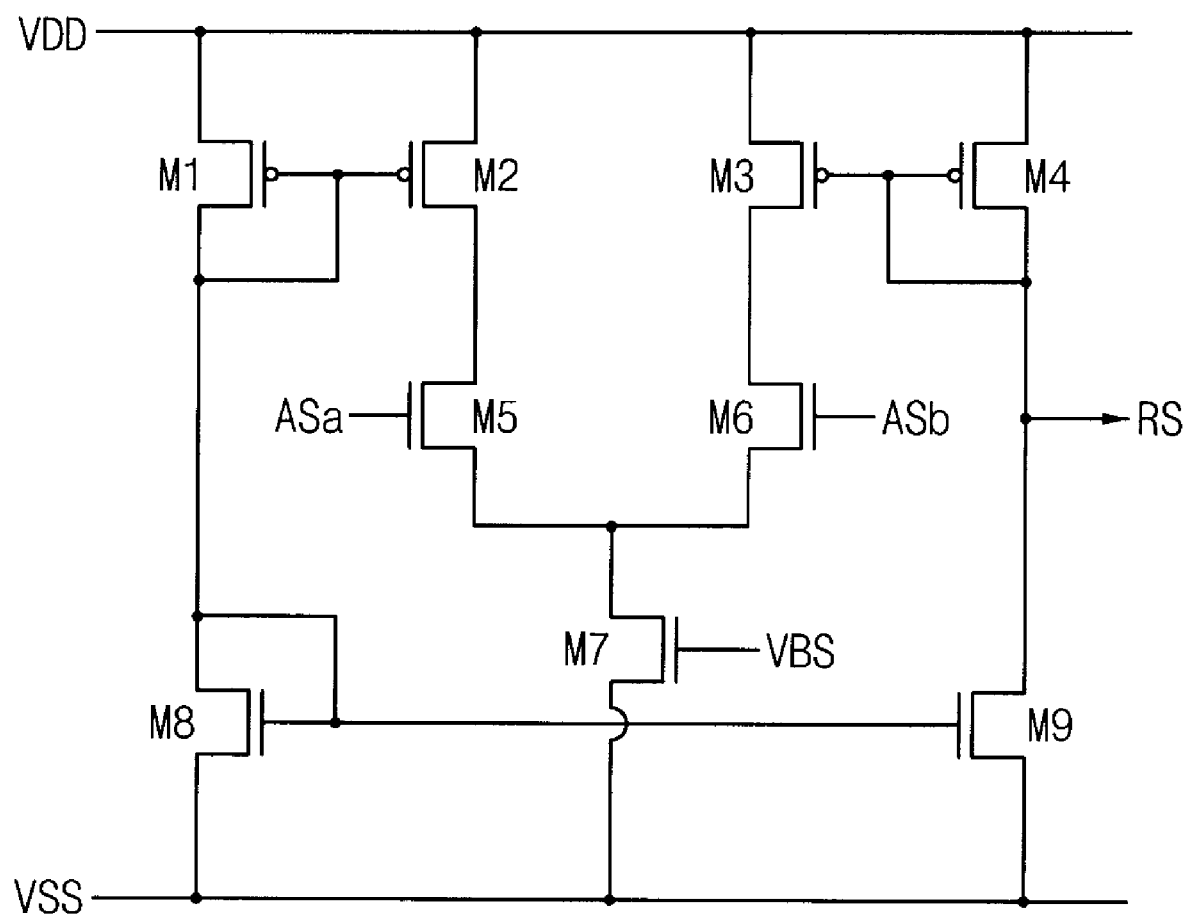
FIG. 7 is a circuit diagram illustrating an example of a single-ended amplifier included in the random signal generator of FIG. 2, according to an exemplary embodiment of the present invention.

FIG. 7 is a circuit diagram illustrating an example of a single-ended amplifier included in the random signal generator of FIG. 2, according to an illustrative embodiment of the present invention.

Referring to FIG. 7, the single-ended amplifier 150 may include PMOS pairs M1 and M2, M3 and M4 in current mirror configurations, an NMOS pair M8 and M9 in a current mirror configuration, an NMOS pair M5 and M6, which receives amplified differential signals ASa and ASb at corresponding gate electrodes, and an NMOS transistor M7, which provides a bias current. It is understood that the structure of the single-ended amplifier 150 is not limited to the structure illustrated in FIG. 7, and that the structure of the single-ended amplifier 150 may be varied. For example, one pair of complementary metal oxide semiconductor (CMOS) inverters may be added to a back-end of the single-ended amplifier.

FIG. 8 is a diagram illustrating waveforms of exemplary signals in a random signal generator of FIG. 2, according to an illustrative embodiment of the present invention.

FIG. 8 illustrates simulation results of a positive signal NSa, a difference NSa-NSb between the positive signal NSa and a negative signal NSb, and a random signal RS, all of which are generated in the differential noise generation circuit 110 in FIG. 2. Only the positive signal NSa of the differential signals NSa and NSb is illustrated in FIG. 8. The difference NSa-NSb between the positive signal and the negative signal randomly transitions among various levels between −200 nV (nano volts) and +200 nV. The differential noise signals NSa and NSb are amplified by the amplification circuit 130 and the random signal RS is output from the single-ended amplifier 150. As illustrated in FIG. 8, the random signal RS has irregular transition time points.

Figure 9:
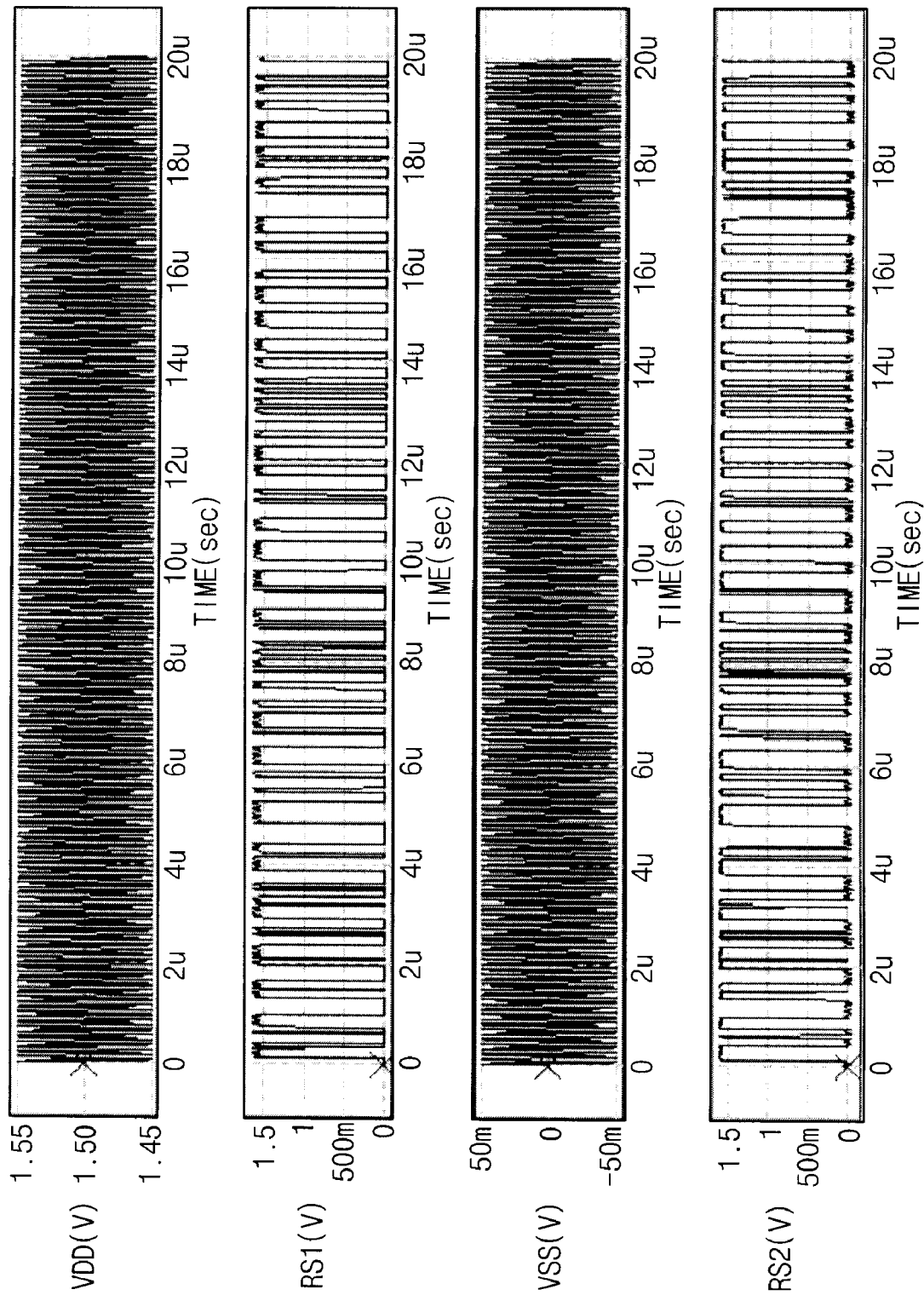
FIG. 9 is a diagram illustrating waveform of an exemplary output signal with respect to a noise in the random signal generator of FIG. 2, according to an exemplary embodiment of the present invention.

FIG. 9 is a diagram illustrating a waveform of an exemplary output signal with respect to noise in the random signal generator of FIG. 2, according to an illustrative embodiment of the present invention.

FIG. 9 illustrates a random signal RS1 output from the random signal generator 100 when the power supply voltage VDD corresponds to a 10 MHz sinusoidal wave having about 100 mV (mili volts) peak-to-peak voltage centered on about 1.5V, and a random signal RS2 output from the random signal generator 100 when the ground voltage VSS corresponds to a 10 MHz sinusoidal wave having about 100 mV peak-to-peak voltage centered on 0V. The sinusoidal waves are applied for testing the case in which the power supply voltage and/or the ground voltage includes noise.

According to FIG. 9, even though the power supply voltage VDD, as well as the ground voltage VSS, includes noise, the random signal generator 100 may generate the random signal (e.g., RS1, RS2), which is more stable and insensitive to the noise, which may be accomplished through the differential self-biased structure.

Figure 10:
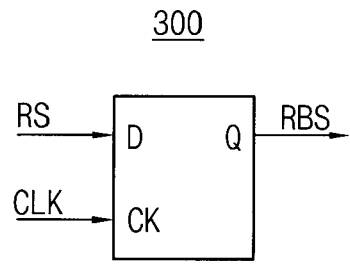
FIG. 10 is a diagram illustrating an example of a sampler included in the random number generator of FIG. 1, according to an exemplary embodiment of the present invention.

FIG. 10 is a diagram illustrating an example of a sampler included in the random number generator of FIG. 1, according to an illustrative embodiment of the present invention.

Referring to FIG. 10, the sampler 300 samples the random signal RS output from the random signal generator 100 and generates random bit stream RBS. The sampler 300 may be implemented with a flip-flop, as illustrated in FIG. 10. A clock signal CLK is applied to a clock node CK, and the random signal RS is applied to a data node D. The flip-flop receives the random signal RS and samples the random signal RS, synchronized with transitions of the clock signal CLK, to generate the random bit stream RBS at an output node Q. The transition of the clock signal CLK may correspond to a rising edge and/or a falling edge.

Figure 11:
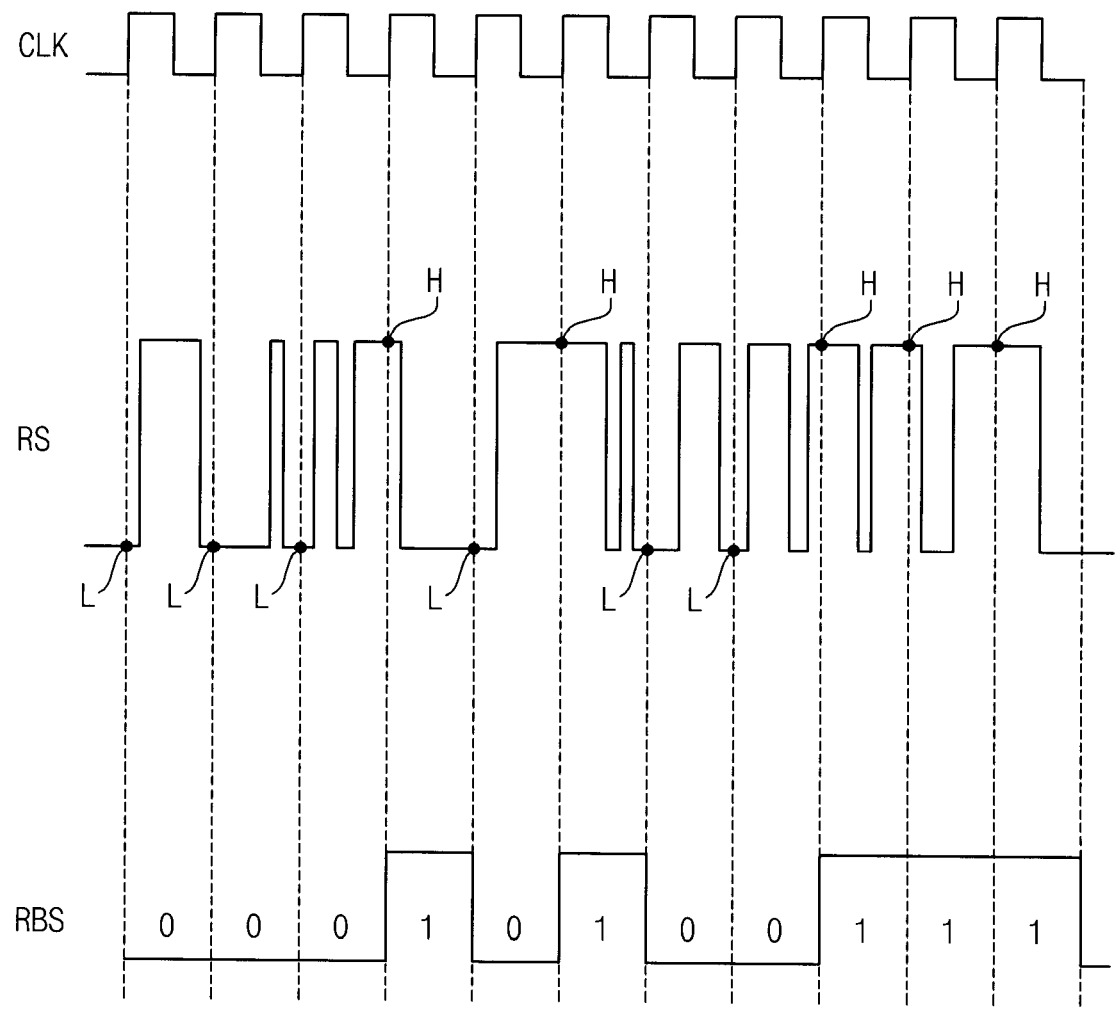
FIG. 11 is a timing diagram for illustrating an exemplary operation of the sampler in FIG. 10, according to an exemplary embodiment of the present invention.

FIG. 11 is a timing diagram for illustrating an operation of the sampler in FIG. 10, according to an illustrative embodiment of the present invention.

Referring to FIG. 11, the random signal RS fully swings between logic high level "H" and logic low level "L", and the duration times of each level are irregular.

FIG. 11 illustrates an example of sampling the random signal RS at a rising edge of the clock signal CLK. When the random signal RS has the logic low level "L" at a rising edge of the clock signal CLK, the random bit stream RBS maintains the low level, i.e., a bit value "0", until a next rising edge. When the random signal RS has the logic high level "H" at a rising edge of the clock signal CLK, the random bit stream RBS maintains a high level, i.e., a bit value "1", until a next rising edge. Accordingly, the bit values "0" and "1" may be randomly determined per clock cycle.

The random bit stream RBS may be processed by the processor 500 shown in FIG. 1 and may be stored in a memory device (not shown) as the random number or may be provided to an external device. The processor 500 may be a digital processor, for example, operated by a program for processing digital signals, and may include the memory device for storing the generated random number.

The random signal generator and the random number generator, according to example embodiments of the present invention, may be implemented according structures similar to those in the embodiments described herein, without departing from the spirit and scope of the invention. For example, the amplifiers may be implemented using elements other than MOS transistors, such as bipolar junction transistors, which have similar functionality to the MOS transistors.

Likewise, the noise source in the differential amplification circuit is not limited to a thermal noise source. Any noise source that provides an irregular noise signal, e.g., based on unpredictable physical phenomena, may replace the thermal noise source, without departing from the spirit and scope of the invention.

Depending on the characteristics of the random signal generator, the number of differential amplifiers included in the amplification circuit, the number of capacitors for removing the DC component of the differential signals, a symmetric structure of the MOS differential pair included in the differential noise generation circuit and the differential amplifier may vary.

As mentioned above, the random signal generator and the random number generator, according to exemplary embodiments of the present invention, may generate a random signal and random numbers with relatively high randomness and insensitivity to noise. In addition, the random signal generator and the random number generator, according to exemplary embodiments of the present invention, may reduce the restriction of the impedances and may operate in a low voltage region, and thus power consumption may be reduced. Furthermore the random signal generator and the random number generator, according to exemplary embodiments of the present invention, are suitable for a CMOS process, and may therefore be manufactured at low cost.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A random signal generator, comprising:
   a differential noise generation circuit, comprising;
      a pair of input nodes that receive noise signals,
      a pair of output nodes that generates differential noise signals, wherein the differential noise generation circuit is self-biased such that the pair of input nodes is coupled to the pair of output nodes,
      a metal oxide semiconductor (MOS) differential pair coupled between a first voltage and a second voltage, wherein gate electrodes of the MOS differential pair are coupled to the pair of input nodes and drain electrodes of the MOS differential pair are coupled to the pair of output nodes,
      a self-bias resistor pair coupled between the pair of input nodes and the pair of output nodes,
      a noise resistor pair coupled to the pair of input nodes,
      a capacitor pair coupled between the noise resistor pair and the second voltage, and
      an input resistor pair coupled between the pair of input nodes and the gate electrodes of the MOS differential pair;
   an amplification circuit configured to amplify the differential noise signals output from the differential noise generation circuit to generate amplified differential signals; and
   a single-ended amplifier configured to generate a random signal based on the amplified differential signals, the random signal having irregular transition time points.

2. The random signal generator of claim 1, wherein the amplification circuit comprises:
   a plurality of cascaded differential amplifiers.

3. The random signal generator of claim 2, wherein each of the differential amplifiers further comprises:
   a capacitor pair coupled to the pair of input nodes, the capacitor pair being configured to remove a DC component of the differential signal received from the previous stage and to provide an AC component of the differential signal to the pair of input nodes of the MOS differential pair.

4. A random signal generator, comprising:
   a differential noise generation circuit, comprising;
      a pair of input nodes that receive noise signals,
      a pair of output nodes that generates differential noise signals, wherein the differential noise generation circuit is self-biased such that the pair of input nodes is coupled to the pair of output nodes,
      a metal oxide semiconductor (MOS) differential pair coupled between a first voltage and a second voltage, wherein gate electrodes of the MOS differential pair are coupled to the pair of input nodes and drain electrodes of the MOS differential pair are coupled to the pair of output nodes, wherein the MOS differential pair comprises;
- a resistor pair coupled between the first voltage and the pair of output nodes, the first voltage corresponding to a power supply voltage,
- an n-channel metal oxide semiconductor (NMOS) transistor pair coupled between the pair of output nodes and a common source node, and
- a current source coupled between the second voltage and the common source node, the second voltage corresponding to a ground voltage,
- a self-bias resistor pair coupled between the pair of input nodes and the pair of output nodes,
- a noise resistor pair coupled to the pair of input nodes, and
- a capacitor pair coupled between the noise resistor pair and the second voltage;

an amplification circuit configured to amplify the differential noise signals output from the differential noise generation circuit to generate amplified differential signals; and a single-ended amplifier configured to generate a random signal based on the amplified differential signals, the random signal having irregular transition time points.

5. A random signal generator, comprising:
a differential noise generation circuit, comprising;
- a pair of input nodes that receive noise signals,
- a pair of output nodes that generates differential noise signals, wherein the differential noise generation circuit is self-biased such that the pair of input nodes is coupled to the pair of output nodes,
- a metal oxide semiconductor (MOS) differential pair coupled between a first voltage and a second voltage, wherein gate electrodes of the MOS differential pair are coupled to the pair of input nodes and drain electrodes of the MOS differential pair are coupled to the pair of output nodes, wherein the MOS differential pair comprises;
  - a resistor pair coupled between the first voltage and the pair of output nodes, the first voltage corresponding to a power supply voltage,
  - an p-channel metal oxide semiconductor (PMOS) transistor pair coupled between the pair of output nodes and a common source node, and
  - a current source coupled between the second voltage and the common source node, the second voltage corresponding to a ground voltage,
- a self-bias resistor pair coupled between the pair of input nodes and the pair of output nodes,
- a noise resistor pair coupled to the pair of input nodes, and
- a capacitor pair coupled between the noise resistor pair and the second voltage;

an amplification circuit configured to amplify the differential noise signals output from the differential noise generation circuit to generate amplified differential signals; and a single-ended amplifier configured to generate a random signal based on the amplified differential signals, the random signal having irregular transition time points.

6. A random number generator, comprising:
a differential noise generation circuit, comprising;
- a pair of input nodes that receive noise signals,
- a pair of output nodes that generates differential noise signals, wherein the differential noise generation circuit is self-biased such that the pair of input nodes is coupled to the pair of output nodes,
- a metal oxide semiconductor (MOS) differential pair coupled between a first voltage and a second voltage, wherein gate electrodes of the MOS differential pair are coupled to the pair of input nodes and drain electrodes of the MOS differential pair are coupled to the pair of output nodes,
- a self-bias resistor pair coupled between the pair of input nodes and the pair of output nodes,
- a noise resistor pair coupled to the pair of input nodes,
- a capacitor pair coupled between the noise resistor pair and the second voltage, and
- an input resistor pair coupled between the pair of input nodes and the gate electrodes of the MOS differential pair;

an amplification circuit configured to amplify the differential noise signals to generate amplified differential signals;

a single-ended amplifier configured to generate a random signal based on the amplified differential signals, the random signal having irregular transition time points;

a sampler configured to sample the random signal to generate a random bit stream; and a processor configured to process the random bit stream to generate random numbers.

7. The random number generator of claim 6, wherein the MOS differential pair comprises one of an NMOS differential pair and a PMOS differential pair.

8. The random number generator of claim 6, wherein the amplification circuit comprises:
a plurality of cascaded differential amplifiers.

9. The random number generator of claim 8, wherein each of the differential amplifiers further comprises:
a capacitor pair coupled to the pair of input nodes, the capacitor pair being configured to remove a DC component of the differential signal received from the previous stage and configured to provide an AC component of the differential signal to the pair of input nodes of the MOS differential pair.

10. The random number generator of claim 6, wherein the sampler comprises:
a flip-flop configured to generate the random bit stream based on the random signal and a clock signal, the random bit stream being synchronized with transitions of the clock signal.

* * * * *